United States Patent

[11] 3,583,525

[72] Inventor Clifton R. Holcomb
 540 South Sandusky, Tulsa, Okla. 74112
[21] Appl. No. 787,921
[22] Filed Dec. 30, 1968
[45] Patented June 8, 1971

[54] ENGINE PREOILER
 11 Claims, 5 Drawing Figs.
[52] U.S. Cl. ................................................... 184/6,
 123/196, 251/120
[51] Int. Cl. ...................................................... F01m 1/16
[50] Field of Search .......................................... 184/6, 6 A;
 123/196, 196 S; 251/139, 120

[56] References Cited
 UNITED STATES PATENTS
2,033,992 3/1936 Moller ........................... 184/6
2,755,787 7/1956 Butler ............................ 123/196
2,867,203 1/1959 Easton et al. ................... 123/196
3,391,900 7/1968 Erickson ........................ 251/120
3,422,807 1/1969 Waldecker ..................... 184/6X
3,425,404 2/1969 Lamkin ......................... 123/196

Primary Examiner—Manuel A. Antonakas
Attorney—Head & Johnson

ABSTRACT: A preliminary lubricating device for internal combustion engines is described in which lubricant is stored under pressure during off periods of the engine to be released upon closing of the starting circuit so that lubricant will flow immediately to parts of the engine which normally do not receive lubrication until the conventional lubricating system has built-up pressure. A pressurizable reservoir is in communication with the lubricating system of the engine and flow of lubricant into and from the reservoir is controlled by a plurality of pistons acting in a valve controlled by a solenoid which in turn is actuated by an electrical system of the starter circuit. The pistons are disposed coaxially on a piston shaft, are biased to a normally closed position, and cooperate to control the direction of flow of lubricant into and from the reservoir.

INVENTOR.
CLIFTON R. HOLCOMB
BY
Head & Johnson
ATTORNEY

INVENTOR.
CLIFTON R. HOLCOMB

BY

Head & Johnson
ATTORNEY

ENGINE PREOILER

BACKGROUND OF THE INVENTION

This invention relates to lubricating systems for mechanical systems such as prime movers as exemplified by internal combustion engines, and more particularly to preliminary lubricating systems for conventional internal combustion engines.

In a conventional internal combustion engine, for example, lubricant is supplied by force to the various operative components during the operation of the engine. However after the engine has become inoperative for some time, this lubricant drains away from the surfaces which normally bear against each other. Then, as the engine is started again, the engine must operate for a short period of time before suitable pressure is built up in the lubricating system to provide proper lubrication. During this period of time the various surfaces which move against each other are subject to more wear than during the period of normal operation of the engine. This wear becomes particularly critical when the engine has been standing for a substantial time during cold weather since then the oil is more viscous and is not readily pumped.

The problem of overcoming this lack of lubrication during the initial startup period has been solved to some extent by the incorporation in internal combustion engines of various lubricating devices known as preliminary lubricating systems or preoilers. A number of these devices may be found in the prior art as, for example, the device described in U.S. Pat. No. 2,867,203 and the device described in U.S. Pat. No. 2,755,787. Both of these patents describe preliminary lubricating devices in which lubricant is stored in a pressurizable container communicating with the usual lubricating system of the engine and from which lubricant is emitted into the lubricating system by actuation of a solenoid valve. However, the arrangement of component parts as described in these patents is more complicated than in this invention and the operation is performed in a different manner.

A different preoiler device is described in copending application Ser. No. 787,893, for SOLENOID VALVE PREOILER.

The primary object of this invention is to provide a preliminary lubricating device which is efficient in operation, simple in construction, and inexpensive and easy to manufacture.

Another object of this invention is to provide a preliminary lubricating device which is actuated by the starting circuit of an internal combustion engine to supply lubricant under pressure to portions of the engine during an initial starting period before the main lubricating system is able to build up operating pressure.

BRIEF DESCRIPTION OF THE DRAWINGS

Further objects and advantages of the invention will become apparent from the following description and claims, and from the accompanying drawings, wherein:

DESCRIPTION OF THE PREFERRED EMBODIMENTS

Figure 1:
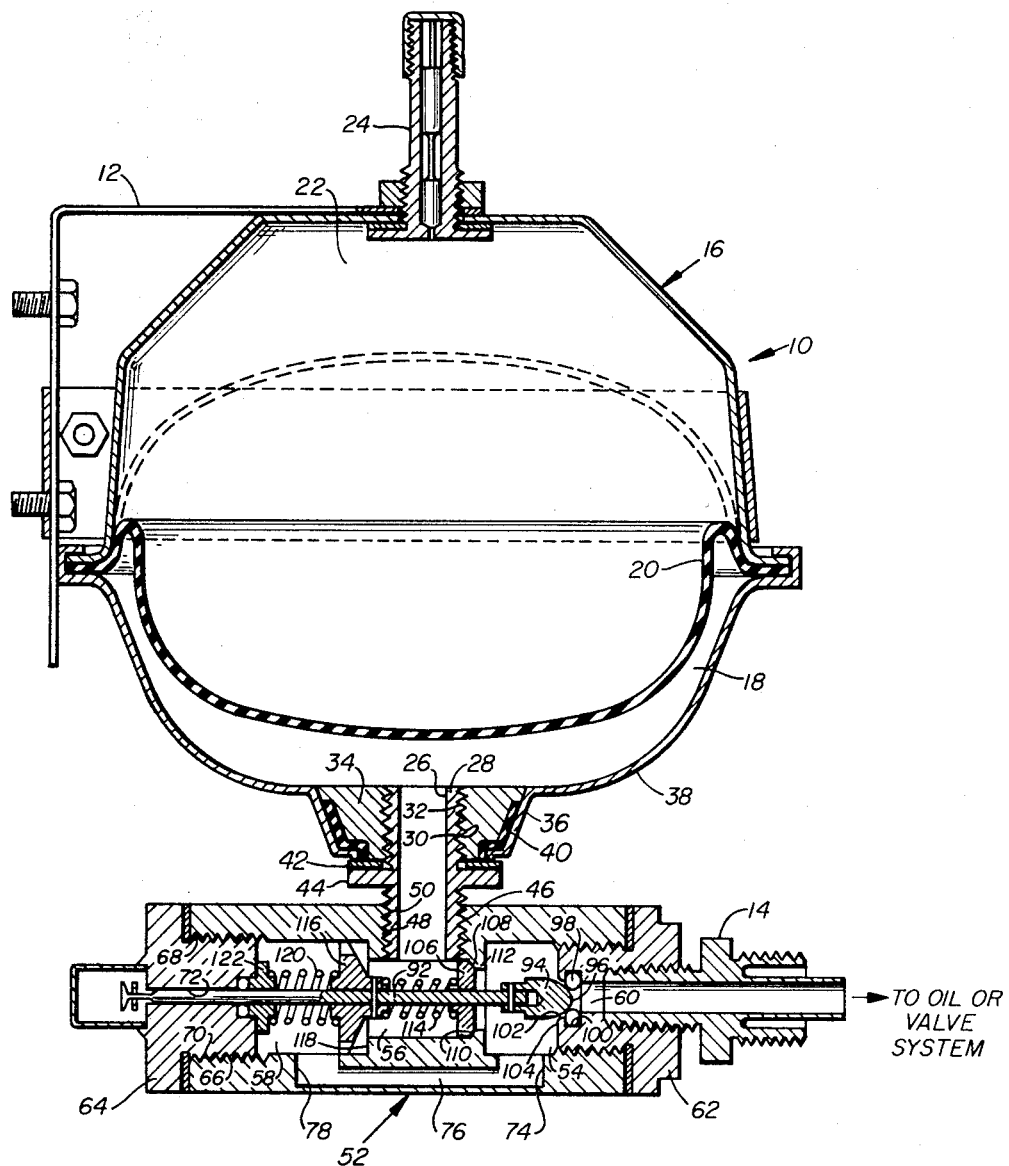
FIG. 1 is a cross-sectional view of a preliminary lubricating device according to this invention showing a valve portion of the device in a closed position.

The preliminary lubricating device of this invention may be incorporated into an engine having an electrical ignition circuit and a pressurizable lubricating system. The preliminary lubricating device itself includes a lubricant reservoir communicating with the pressurizable lubricating system of the engine with the communication between the reservoir and the lubricating system being controlled by a solenoid valve arranged in series connection to the electrical ignition circuit of the engine. When used with an engine in which the electrical ignition circuit includes a starter circuit, the field coil of the solenoid valve is connected in series with the starter circuit so that actuation of the starter circuit actuates the solenoid valve to permit lubricant maintained in the reservoir under pressure to flow into the lubricating system of the engine to provide lubrication to those parts of the engine which otherwise do not receive lubrication during the initial start up of the engine. A single solenoid valve is used in the preliminary lubrication device and is positioned so that the plunger of the solenoid valve is leverably attached to a piston shaft within the valve body. A valve and two pistons are positioned coaxially on this piston shaft, a first valve pinned to the end of the shaft, a first piston slidably disposed thereon, and a second piston pinned to the shaft remote from the valve. The valve and pistons are biased to normally closed positions. Thus, communication between the lubricant reservoir and the engine lubricating system is controlled by cooperation of the solenoid valve and the check valve and pistons. As pressure develops in the engine lubricating system the biasing means of the pistons is overcome and lubricant is permitted to flow into the lubricant reservoir until pressure in the reservoir equals the pressure in the lubricating system at which time the biasing means bring the check valve and two pistons to their closed configurations. When communication between the lubricant reservoir and the lubricating system is closed, the lubricating fluid in the reservoir is maintained at a pressure equal to the normal operating pressure of the engine-lubricating system. Upon actuation of the engine-starting system, the check valve and the second piston are brought to an open position, permitting lubricant to flow from the reservoir through a bypass line and into the now unpressurized lubricating system to provide an initial lubrication in the engine's parts. At the same time the first piston is forced closed by the pressure of fluid upon its rear face. Under normal circumstances the starter circuit of an internal combustion engine then becomes inactive after the engine starts, and consequently the solenoid circuit of this invention also becomes inactive at that time which permits the check valve and pistons to assume their normally closed positions. The check valve and two pistons are positioned coaxially on the piston shaft so that the check valve, pinned to the piston shaft, can provide an effective seal between the lubricant reservoir and the engine lubricating system; a first piston, which is slidable on the piston shaft, can determine the direction of flow of lubricating fluid between the lubricant reservoir and the lubricating system; and a second piston, pinned to the piston shaft which by hydraulic pressure thereon automatically maintains the check valve in an open condition after actuation of the solenoid pilot. This open condition is held until the engine has been prelubricated from the reservoir or until engine pressure and reservoir pressure are balanced. A bypass permits lubricant to flow from the reservoir to the engine lubricating system with the first piston in its closed position.

Referring now to the drawings in detail, a preliminary lubricating device according to this invention 10, is secured to an internal combustion engine by means of a suitable bracket 12, and positioned to communicate with a lubricant line of the engine's lubricating system by means of a conventional fitting 14. The preliminary lubricating device 10 has means to provide pressurized storage of lubricant which includes an accumulator 16 having therein a lubricant reservoir 18 provided by the sealable engagement of a flexible diaphragm 20 within a lower position of accumulator 16. Accumulator 16 also includes an air reservoir 22 which can be pressurized to controllable pressure by admission of air through a conventional air valve 24 as is used in an automobile tire. Thus, lubricating fluid can be permitted to flow into reservoir 18 during operation of the internal combustion engine until compression of the air within air reservoir 22, caused by the increase in the volume of oil within reservoir 18, equals the pressure within the engine lubricating system. At that time the equalization of pressures prevents any further flow of lubricant into reservoir 18, and other components of the lubricating device operate to close communication between the engine lubricating system and reservoir 18. That is, lubricating fluid entering reservoir 18 through passage 26 in threaded fitting 28 operates against a resistive force applied to diaphragm 20 by compressed air in air reservoir 22. Threaded fitting 28 has external threads 30 which cooperate with internal threads 32 on threaded fitting 34. Threaded fitting 34 is preferably hexagonal in shape to fit within a similarly shaped extension 36 of lower portion 38 of reservoir 18. A hexagonally shaped seal member 40 is positioned between fitting 34 and extension 36, which seal member may be of rubber, soft plastic, or soft metal as copper, or any similar material. Thus, in assembly, seals 40 and 34 are placed within lower portion 38, a washer 42 is placed over fitting 28 adjacent threads 30, and fitting 28 is tightened within fitting 34 by applying a suitable wrench to hexagonal portion 44 of fitting 28. At the other end of fitting 28 is a series of external threads 46 which cooperate with internal threads 48 in bore 50 of valve body 52.

Valve body 52 includes a series of three coaxial bores, 54, 56, and 58, disposed so that the middle one of these bores 56, is in communication with the first bore 54 and with the third bore 58, and is in further communication with bore 50. First bore 54 is in communication with passageway 60 in fitting 62, which passageway constitutes an outlet for valve body 52 to permit lubricating fluid to flow from reservoir 18 into the lubricating system of the engine as through fitting 14. Fitting 14 may connect the lubricating device of this invention to the lubricating system of the engine, or it may connect the lubricating device to outlets positioned near the valves of the engine. If connected to a line of the engine's lubricating system, the lubricating device can pressurize the entire lubricating system, or a selected portion thereof, before the lubricating system builds up its own pressure. Then, as outlined above, the operating pressure of the lubricating system will repressurize the preliminary lubricating device. If the flow of lubricant from the preliminary lubricating device is directed to areas near the engine valves, then, by a separate inlet system as described in said copending application Ser. No. 787,893, however, it is the operating pressure of the engine-lubricating system that repressurizes the lubricating device and reservoir.

At the other end of valve body 52 is a fitting 64 having external threads 66 which cooperate with internal threads 68 in bore 70 of the valve body 52. Fitting 64 has a central bore 72 which is coaxial with bores 54, 56 and 58. Communicating with bore 54 is a side bore 74 which communicates with a bypass passageway 76 which in turn communicates with a side bore 78 which communicates with bore 58. Thus, bore 74, bypass 76, and bore 78 cooperate to provide a means for lubricating fluid to flow between bore 54 and bore 58 during operation of the preoiler. Of course, it would be possible for the same communication between bore 54 and bore 58 to be provided by external fittings and an external bypass line, but it is believed that integral casting and machining of the bypass line makes the device simpler to manufacture, less expensive, and eliminates maintenance of additional parts.

A piston shaft 92 extends longitudinally through bores 58 and 56 into bore 54. A valve 94 is pinned to shaft 92 in a manner that a front surface 96 can act against a resilient O-ring in a circumferential channel 100 and curved surface 102 of shoulder 104. In assuming its closed position valve 94 contacts O-ring 98 with sufficient force to close the valve body to passage of lubricant, but O-ring 98 does not become distorted since surface 94 contacts curved surface 102 and valve 94 is therefor limited in its forward movement. Within the middle bore 56 a piston member 106, which may be designated first piston, is disposed slidably on piston shaft 94 and includes a front surface 108 which cooperates with a surface 110 of shoulder 112 to act as a closure means to close communication between bores 54 and 56. An alternate embodiment of this closure means is described in FIG. 1A. Piston 106 is biased to a normally closed position by a coil spring 114 operating against a front surface of a second piston 116 which is pinned to piston shaft 92 and positioned within bore 58. Piston 116 is biased to a normally closed position against shoulder 118 by a coil spring 120 and held in position by a retaining member 122 set within bore 124 of fitting 64. Retaining member 122 also holds in place an O-ring seal 126. At the outer end of fitting 64 is a dust filter 128 held in place by a retainer 130.

Figure 1A:
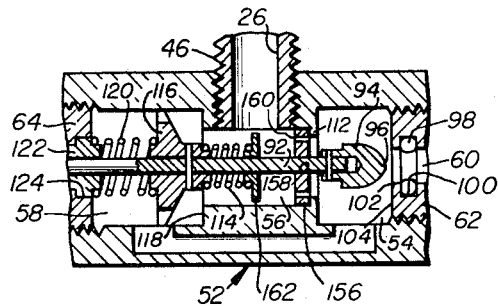
FIG. 1A discloses an alternate embodiment of the closure means.

All of the valve and piston members described in FIGS. 1 and 1A, together with their related retaining members, coil springs, and sealing members, are especially designed with relationship to bores 54, 56 and 58, so that all of the components may be easily inserted into the valve body as a unit, and so that they may be readily withdrawn from the valve body as a unit for easy repair or replacement.

Near the outer end of piston shaft 92 is a reduced neck portion 132 designed to engage detachably a clevis 134 on arm 136 which is attached leverably to arm 138 of plunger 140 of a solenoid member 142. Plunger 140 responds to electrical current flowing through field coil 144 of solenoid 142 to move axially within the solenoid and by this movement control the opening and closing of valve 94 and second piston 116. Current is supplied to field coil 144 by a battery 146 and lead in wire 148, and the circuit is completed by ground wire 150 which leads from coil 144 or, if desired, from a ground connection on solenoid 142 if coil 144 is more suitably grounded to the casing of the solenoid. Of course, battery 146 may be replaced by other suitable sources of power if the preoiler of this invention is used in other installations than an internal combustion engine. A coil spring 152 between plunger 140 and the end 154 of solenoid casing acts to reduce hammer by plunger 140 when the current flows in the solenoid and causes the plunger to move toward casing end 154 with increased initial power, and also acts as an additional biasing force to bring valve 94 to its closed position when the solenoid field coil is deenergized.

In the alternate embodiment shown in FIG. 1A, the effect and operation of first piston 106 is accomplished by a combination of elements. A perforated guide member 156 is tightly fit into bore 56 and serves as a guide for piston 92. Piston shaft 92 slides through bore 158. Passageways 160 permit lubricating fluid to flow past guide member 156. It is not necessary that guide member 156 remain stationary within bore 56 during operation of the preoiler, but restricted movement of the guide member enhances that stability of piston shaft 92. Biased against guide member 156 by coil spring 114 is a piston member 162 disposed slidably on piston shaft 92. Piston member 162 is designed to move freely within bore 56 in response to the forces acting upon it, namely the biasing force of springs 114, 120 and 152 in one direction, and the force of lubricating fluid in the other direction. In operation, guide member 156 preferably remains stationary in the position shown in FIG. 1A, and is not moved within bore 56 by either force of lubricating fluid or by operation of solenoid 142 since valve member 94 does not contact guide member 156 when solenoid 142 is actuated.

Assembly and disassembly of the valve components of this preoiler are simple operations. Assembly is accomplished by arranging the valve components in this proper relationship on piston shaft 92, inserting piston shaft 92 in the valve body, and securing fittings 62 and 64 to the valve body with the O-rings and retainers in place. Disassembly is simply the reverse process.

Figure 2:
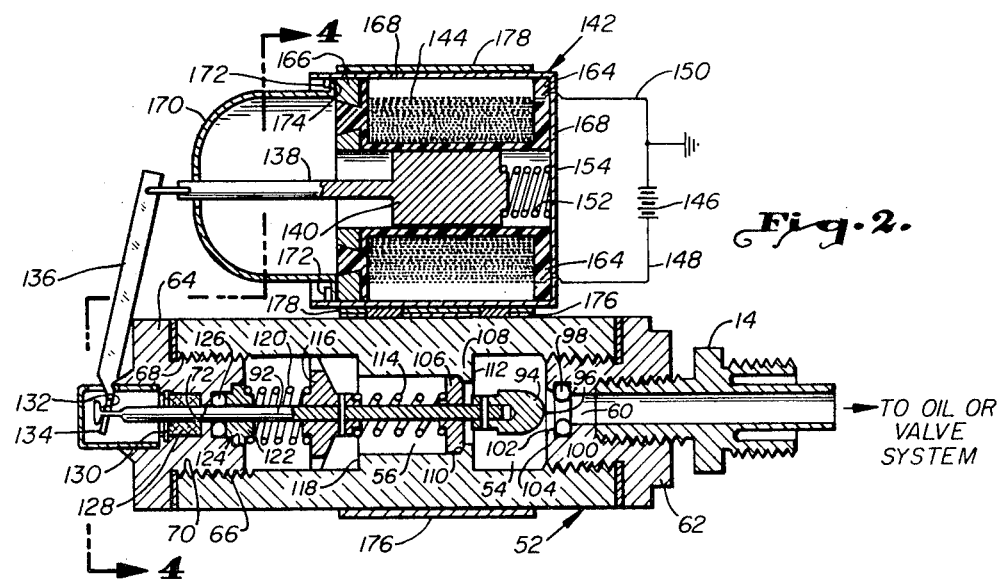
FIG. 2 is a cross-sectional view of a valve and solenoid portion of a preliminary lubricating device according to this invention showing the solenoid in an actuated condition and the valve in a partially open condition.
Figure 4:
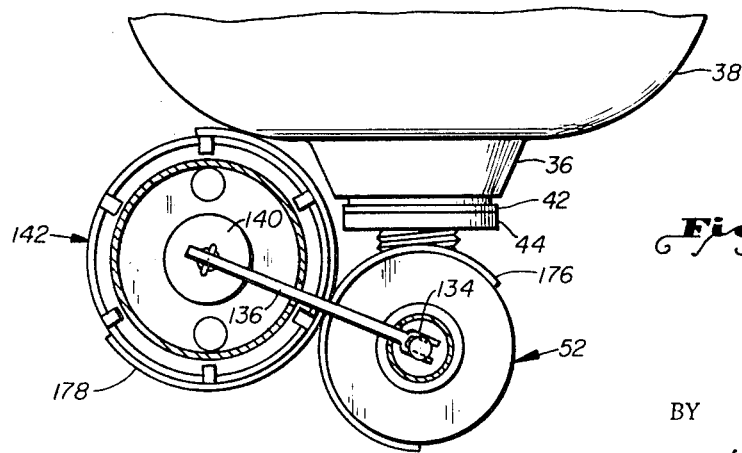
FIG. 4 is a fragmentary elevational view along the lines 4—4 of FIG. 2.

Solenoid 142 has the components of a conventional solenoid but is prepared in a special manner. A spool member 164 is molded of a plastic material, rubber, nylon, or other suitable plastic, integrally with an iron cladding washer 166. Then after molding, the spool is wound with suitable wire to form the field coil 144. The field coil is placed in a metal casing 168, coil spring 152 and plunger 140 put in position, and a metal dust cap 170 put in place and secured to casing 168 by suitable means, as by crimps 172 bent in casing 168 over shoulder 174. Valve body 52 and solenoid 142 can be held in position by any suitable means, but one preferable manner of performing this task is shown in FIG. 2 and FIG. 4. A clip member 176 holds valve body 52 and is attached to a clip member 178 which holds solenoid 142.

In operation, the valve and piston members of the preoiler device are biased to normally closed positions to prevent communication between the lubricant reservoir and the oil system of the engine, and are brought to their open condition by either the operation of the solenoid member or by the oil pressure of the engine when it is operating as hereinafter described. With lubricant reservoir 18 empty and the internal combustion engine operating, pressure builds up in the lubricating system of the engine and lubricant forces valve 94 off its seat against O-ring 98 and piston 106 from its closed condition so that lubricant enters bore 54, bore 56, passes through passage 26 and into lubricant reservoir 18. Air reservoir 22 had previously been pressurized with air adjustably to a degree to permit a predetermined volume of lubricant to enter reservoir 18 at the operating lubricant pressure of the engine, said volume is obtained when the pressure of the air in reservoir 22 being compressed by the influx of lubricant equals the operating lubricant pressure of the engine. At the time the air pressure in reservoir 22 equals the lubricant pressure, the biasing means in the valve body, coil spring 120, and to a lesser degree, spring 152, move valve 94 to its closed position against O-ring 98. When the engine is subsequently turned off, the predetermined volume of lubricant forced into reservoir 18 as described above, is now maintained in reservoir 18 under a pressure, by compression of the air in air reservoir 22, which is equal to the original operating pressure of the engine.

As the ignition key of the engine is turned on, or some similar switch if the lubricating device is used in conjunction with a different apparatus as with a compression pump, solenoid 142 is actuated causing plunger 140 to move sharply, as to the right in FIG. 2, and since plunger 140 is leverably connected to piston shaft 92, valve 94 attached thereto is moved from its seat against O-ring 92 and is moved a short distance from said seat so that in this maneuver valve 94 does not contact piston 106, and therefore piston 106 is not moved from its seat in this phase of the operation. Since both valve 94 and second piston 116 are pinned to shaft 92, actuation of the solenoid also moves piston 116 slightly from its seat. Therefore, communication can now be had between oil reservoir 18, passage 26, bore 56, bore 58, bypass 76, bore 54, and passage 60, so that oil may pass from the reservoir into the appropriate portion of the engine lubricating system. It should be specifically noted that in this operation oil exerts a force upon the backface of piston 106 to assist in keeping this piston closed at this time. At the same time the oil flowing from reservoir 18 exerts a force upon the forward face of second piston 116 to assist in keeping this piston open which action in turn keeps valve 94 open.

The advantage of providing for piston 106 and piston 116 is that they cooperate in the above operation to delay the closure of valve 94 until the engine has built up its proper operating oil pressure.

FIG. 2 shows the valve components in a partially opened condition, as they would be upon actuation of the solenoid. Valve 94 and piston 116 have been moved from their seats and piston 106 remains seated since actuation of the solenoid does not bring valve 94 back a sufficient distance to contact piston 106 and since the oil at this phase of the operation is flowing from the reservoir into the engine lubricating system.

Figure 3:
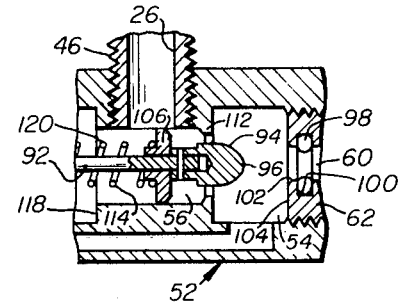
FIG. 3 is a fragmentary cross-sectional view similar to FIG. 2 showing a valve portion of the device in a fully open condition.

FIG. 3 shows valve 94 and piston 106 of the embodiments of FIGS. 1 and 2 as they would approximately be positioned when the oil reservoir is empty and the engine oil pressure is building up so that oil is now flowing from the engine lubricating system into the preliminary lubricating device.

FIG. 1A shows an alternate embodiment in which the piston member 106 of the embodiment of FIG. 1 has been replaced by a two component member. In FIG. 1A the oil reservoir is being filled by the flow of oil under pressure from the engine-lubricating system. Guide member 156 may, if desired, be of sufficiently tight fit to retain its position during operation. As shown, oil flowing through passageways 160 have impinged against piston 162 and have moved it from its closed position, now permitting oil to flow into bore 56 and passageway 26.

Since many different embodiments of this invention may be made without departing from the spirit and scope thereof, it is to be understood that the specific embodiments described in detail herein are not to be taken in a limited sense, since the scope of the invention is best defined by the appended claims.

What I claim:

1. A preliminary lubricating device for an engine having an electrical circuit and a pressurizable lubricating system, comprising:
    a lubricant reservoir having a first opening therein to permit passage of lubricant thereinto and therefrom and means to provide pressurizable storage of lubricant, a valve body depending from said reservoir having
    an inlet and an outlet, said inlet communicating with said opening of said reservoir, said outlet communicating with the lubrication system of said engine,
    three coaxial bores disposed so that a first and third of said bores each communicates with a middle one of said bores and said middle bore further communicates with said inlet,
    a piston shaft slidably disposed within said bores, valve means arranged on said shaft, including
    a valve member pinned to said shaft within said first bore,
    a first piston member slidably disposed on said shaft within said middle bore, and
    a second piston pinned to said shaft within said third bore,
    means biasing the valve member and the first piston to a closed position,
    bypass means communicating with said first and third bores, and
    solenoid means having
        a field coil connected in series to said electrical circuit, and
        a plunger leverably connected to said piston shaft, so that upon actuation of said solenoid means said piston shaft responds to movement of said plunger to move said valve member and said second piston to open position allowing pressurized lubricant to flow from said reservoir into said lubrication system.

2. A preliminary lubrication device as described in claim 1 wherein:
    said electrical circuit includes an ignition circuit,
    said ignition circuit further includes a starter circuit, and
    said solenoid means is in series relationship to said starter circuit.

3. A preliminary lubricating device as described in claim 2 wherein:
    said means to provide pressurized storage of lubricant includes
    a resilient diaphragm dividing said reservoir into a first and a second compartment, said first compartment including said first opening in said reservoir,
    a second opening in said reservoir communicating with said second compartment to permit introduction of pressurizing fluid into said second compartment, and valve means in said second opening to control the flow of said pressurizing fluid.

4. A preliminary lubricating device as described in claim 3 wherein:
    said valve body further includes a resilient sealing member disposed around said piston shaft within said third bore.

5. A preliminary lubricating device as described in claim 4 wherein:

said closure means includes a resilient member disposed within a circumferential channel in said first bore, a first wall of said channel having a rounded edge acting as stop means to limit movement of said piston after contact of said piston with said resilient member.

6. A preliminary lubricating device as described in claim 5 wherein:

said means biasing said valve member and said first piston to closed positions includes a first coil spring disposed around said piston shaft within said middle bore and a second coil spring disposed around said piston shaft within said third bore.

7. A preliminary lubricating device as described in claim 6 wherein:

said first coil spring is more easily compressible than is said second coil spring.

8. A preliminary lubricating device as described in claim 7 wherein:

said solenoid means includes means biasing said plunger to a first position to assist in closing of said valve member and said first piston.

9. A preliminary lubricating device as described in claim 8 wherein:

said second piston includes at least one circumferential groove to permit flow of a minor amount of lubricant around said piston.

10. A preliminary lubricating device as described in claim 1 wherein:

said solenoid includes a spool member upon which said field coil is disposed, a metallic member molded integrally with a flange of said spool, and means biasing said plunger to a first position to assist in closing of said valve member and said first piston.

11. A preliminary lubricating device mountable in any position relative to an engine having an electric starter ignition system and a pressure-lubricating system comprising:

a lubricating oil accumulator having a flexible divider therein defining first and second substantially sealed chambers, a valve body having an outlet from said first chamber communicable with said engine pressure-lubricating system, valve means in said valve body normally closing said outlet and sealing said first chamber, means to actuate said valve to open said outlet upon actuation of said starter ignition system, means associated with said valve means to maintain said valve open for flow from said first chamber into said outlet after said actuation, by the flow of said lubricant from said reservoir, means to refill said reservoir to a predetermined pressure from said lubricating system and close said valve means until the next start actuation, and means to apply predetermined pressure into the second chamber.